United States Patent

[11] 3,576,251

[72] Inventor Robert W. Clyne
 5701 Sheridan Road, Chicago, Ill. 60626
[21] Appl. No. 776,568
[22] Filed Nov. 18, 1968
[45] Patented Apr. 27, 1971

[54] PRODUCT HANDLING APPARATUS
 5 Claims, 3 Drawing Figs.
[52] U.S. Cl. .................................................. 198/159,
 198/174, 198/208, 210/526, 214/17
[51] Int. Cl. ....................................................... B65g 19/10,
 B01d 21/04
[50] Field of Search .......................................... 198/174,
 172, 173, 169, 66, 168, 159, 208; 214/17.8;
 210/526

[56] References Cited
 UNITED STATES PATENTS
 353,436 11/1886 Andrus ........................ 198/159X
 1,475,596 11/1923 Redler .......................... 198/159
 2,279,862 4/1942 Sinden ......................... 198/172

FOREIGN PATENTS
 515,102 11/1939 Great Britain ................ 198/169

Primary Examiner—Robert G. Sheridan
Attorney—Pendleton, Neuman, Williams & Anderson ABSTRACT: An apparatus of the general type described in my U.S. Pat. No. 3,303,920 is provided which is adapted for use in the mechanical handling of industrial waste that has accumulated along the bottom of a settling tank. The apparatus comprises a conveyor assembly having a power actuated endless carrier provided with a plurality of elongated flights. The flights engage the waste accumulated along the tank bottom and then elevate same along one vertical wall of the tank to a predetermined discharge station. The apparatus includes means for frictionally engaging the carrier flights prior to the latter moving along the tank bottom and engaging the waste accumulated thereon whereupon tension is imparted to a portion of the carrier while it is adjacent the tank bottom and causes the flights carried thereby to assume proper relative waste contacting positions.

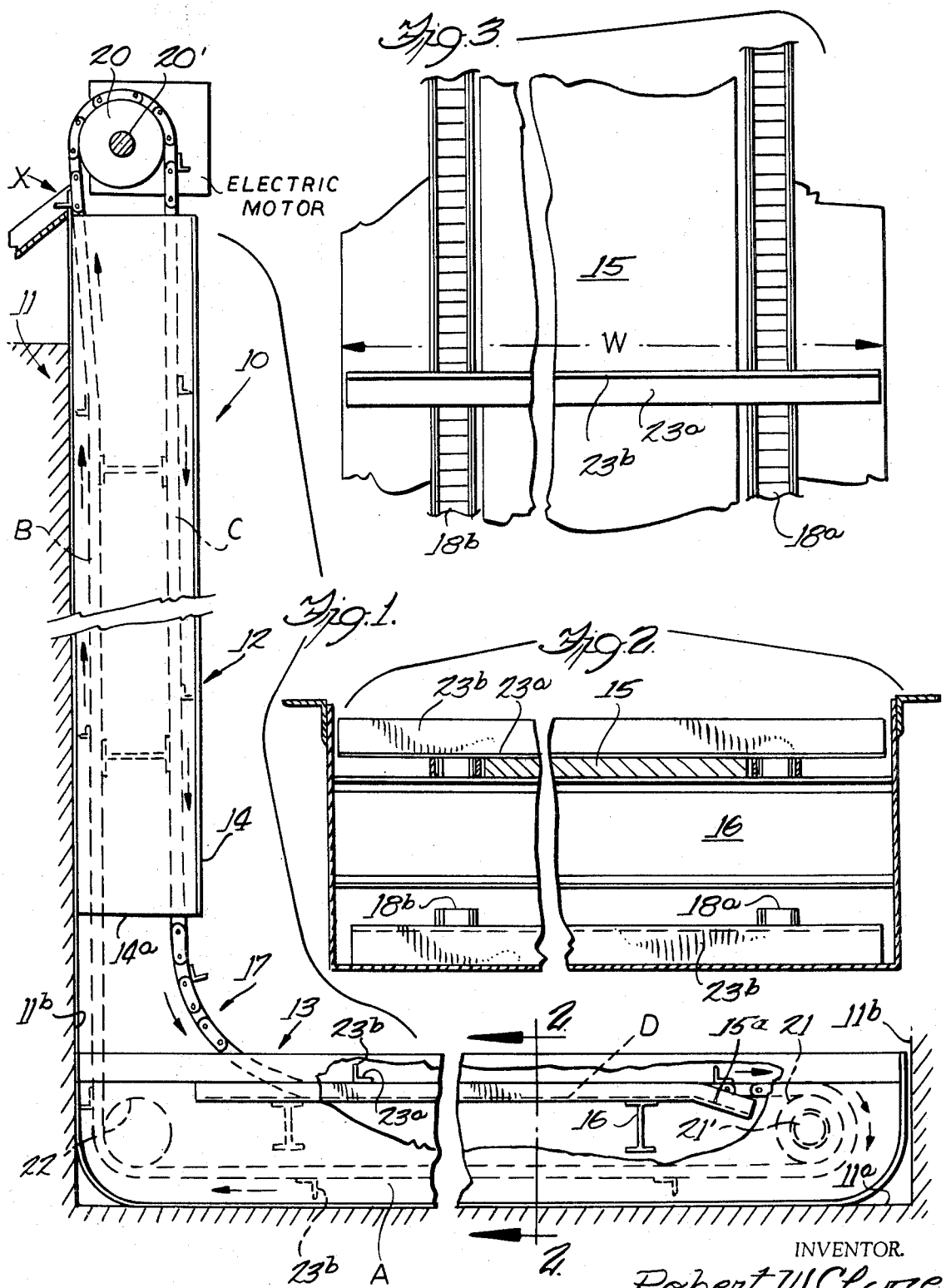

PRODUCT HANDLING APPARATUS

BACKGROUND OF THE INVENTION

In the handling of mechanical waste, particularly when it has accumulated in a deep tank or reservoir which has a relatively small bottom, the utilization of mechanical means oftentimes becomes an awkward, costly and inefficient operation. One important factor contributing to the difficulty of this operation is that the flights which are mounted on the endless carrier do not assume their proper transverse relative positions with respect to the bottom of the reservoir when they are in contact with the waste which has accumulated thereon. By reason of this improper flight disposition, the effectiveness of each of the flights to move the accumulated waste along the bottom to the vertical wall of the reservoir and then up said wall is materially reduced. The difficulty with regard to the flight disposition stems in part from the inability of imparting tautness to the segment of the carrier as it is moving along the bottom of the reservoir, particularly where the run of said carrier segment is relatively short.

Efforts to remedy this situation by mechanical means have in the past been unsuccessful and/or impractical because of cost or the difficulty in maintaining and servicing such means.

SUMMARY OF THE INVENTION

Thus, it is an object of this invention to provide a product handling apparatus which is of simple construction, is readily capable of handling various types of industrial waste, and is adapted to be installed in a variety of sump tanks or reservoirs.

It is a further object of this invention to provide a product handling apparatus which requires but a minimum of maintenance and service.

Further and additional objects will appear from the description, accompanying drawings and appended claims.

In accordance with one embodiment of the invention, a product handling apparatus is provided which is adapted to be installed in a sump tank or the like having a small bottom surface and vertical walls. The apparatus includes a frame having a vertical section, which is disposed adjacent one of the tank walls, and a base section connected to the lower end of the vertical section and extending laterally therefrom. The frame base section is adapted to overlie and rest upon the tank bottom surface. Mounted on the frame base section is a flat plate which is spaced above and is substantially parallel to the tank bottom surface. An endless power-actuated conveyor assembly is mounted within said frame and has one portion thereof disposed within said vertical section and a second portion thereof disposed within said base section. The conveyor assembly includes an endless carrier means, power driven first wheel or sprocket means mounted on said frame adjacent the upper end of said vertical section, second wheel or sprocket means mounted on said frame adjacent the distal end of said base section, guide means mounted on said frame at the juncture of said vertical and base sections, and a plurality of elongated flights carried by and arranged in spaced relation on the endless carrier means. When the flights are passing through a first segment of travel, they engage the frame base section and the product accumulated thereon and move said product towards the frame vertical section. When the flights are passing through a second segment of travel, they engage the frame vertical section and elevate the contacted product to a predetermined discharge station. The flights, when moving from the first to the second wheel or sprocket means, frictionally engage the flat plate and cause tautness to be imparted to the carrier means as it is moving through said first segment of travel.

DESCRIPTION

For a more complete understanding of the invention, reference should be made to the drawings wherein:

FIG. 1 is a fragmentary view partially in vertical section of one form of the improved apparatus;

FIG. 2 is an enlarged fragmentary sectional view taken along line 2-2 of FIG. 1; and FIG. 3 is a fragmentary top plan view of the apparatus shown in FIG. 2.

Referring now to the drawing and more particularly to FIG. 1, a preferred embodiment of the product handling apparatus 10 is shown disposed within a sump tank or reservoir 11. The tank 11 in this instance is formed from concrete or other suitable material and includes a bottom horizontally disposed surface 11a of relatively short length and small area, which is delimited by vertically extending walls 11b. Into the tank is deposited liquid, such as cutting oil, waste water or a washing solution in which solid waste particles are entrained. The liquid remains in a relatively quiescent state for a predetermined time within the tank whereupon the entrained waste particles settle by gravity along the bottom surface. After expiration of a predetermined time period, a relatively clean liquid may be withdrawn.

The improved apparatus 10 is provided to facilitate the removal of the solid waste products which have accumulated along the tank bottom surface 11a. Apparatus 10, in one form, is particularly suitable for use in tanks or reservoirs wherein the bottom surfaces thereof are relatively short and are of relatively small areas.

Apparatus 10 includes a substantially L-shaped frame 12 which is disposed within the tank 11. The frame 12 has an open top base section 13 which is properly sized so as to rest upon and overlie substantially the entire tank bottom surface 11a. Extending upwardly from one end of base section 13 is a frame vertical section 14. Section 14 is normally positioned so as to engage one of the tank walls 11b. It will be noted that the height of section 14 is greater than the tank wall 11b so as to facilitate discharge of the elevated portions of the accumulated waste products in a manner to be described more fully hereinafter.

Frame base section 13 is open at the top so as to receive the waste product as it settles towards the bottom of the tank. The frame vertical section 14, on the other hand, is preferably an elongated open structure, or the inside face of the section may be covered by a suitable length.

Disposed within frame base section 13 and arranged in spaced substantially parallel relation with respect to the tank bottom surface 11a is an elongated substantially flat plate 15. The plate is held in a stationary position within the base section 13 by a plurality of transversely extending supporting beams 16 which are secured at their opposite ends to the frame base section 13. The size and length of the plate 15, and the number of plates to be utilized will depend upon the shape of the frame section 13. Where more than one plate is utilized, not shown, the plates are arranged in aligned coplanar relation with a spacing provided therebetween for a purpose to be discussed hereinafter.

Enclosed within frame 12 is a conveyor assembly which includes an endless carrier means 17. The carrier means in the illustrated embodiment comprises two sections of chain 18a and b which are arranged in horizontally, or laterally, spaced relation. Cooperating with the chain sections 18a and b are strategically located sprockets or pulleys 20, 21 and 22. Sprocket 20 is power driven and is mounted on the frame 12 above a discharge station X located on the vertical section 14, see FIG. 1. Sprocket 20 is adapted to be driven in clockwise direction about a horizontal axle 20'. Power is supplied to axle 20' by a conventional electric, air, or hydraulic motor or by gas-engine drive, see FIG. 1.

Mounted on the distal end of frame base section 13 for rotation about a horizontal axle 21' is a wheel, roller or sprocket 21. Axle 21' is spaced above the lower side of base section 13 so that the chain sections 18a and b can move in a horizontal direction beneath the axle and towards the frame section 14 during one segment A of travel.

Sprocket or roller 22 is located at the juncture of frame sections 13 and 14 and effects a change in the direction of movement of the chain sections so that during the segment B of travel, the chain sections are moving upwardly in a vertical plane which is normally in close proximity and parallel to the tank wall 11b. The axis for power sprocket 20 and the axis for sprocket 22 are not in vertical alignment so that the periphery of sprocket 20 will be offset outwardly and thus cause the chain sections, subsequent to passing the upper end of section 14, the latter being the discharge station X, to abruptly spring outwardly and dislodge the elevated accumulated product from the flights 23 carried by the chain sections.

Each of the flights 23 in the illustrated embodiment is formed of an elongated angle section and extends transversely of the chain sections. Subsequent to the flights 23 having moved about sprocket 20, they then travel downwardly within frame section 14 through segment C of travel. Upon the chain flights leaving the lower end 14a of frame section 14, the chain sections assume a catenary curve until the flights contact the upper surface of the plate 15. While the flights 23 are in contact with plate 15, they pass through a segment D of travel. Sprocket or roller 21 is located at the end of travel segment D. The flights cooperate with one another to maintain the chain sections in proper spaced relation throughout the segments of travel A—D. The length of each flight approximates the width W of the frame base section 13 which, in turn, approximates the width of the bottom surface 11a of the tank. As seen in FIG. 3, plate 15 substantially spans the distance between the chain sections 18a and b and thereby may serve as a guide therefor against lateral displacement as the flights move through segment D.

As seen in FIG. 1, one leg 23a of each flight is affixed to the chain sections 18a and b and the other leg 23b projects outwardly therefrom. During segment A of travel, the flight leg 23b projects vertically downwardly and engages the product which has settled to the bottom of the base section 13 and moves the product towards section 14. As the flights move through segment B, the contacted product is elevated to the discharge station X. A stripper mechanism, not shown, may be adjustably mounted adjacent the discharge station X which would cooperate with the elevating flights and thereby facilitate removal of the waste contacted by the flight upon the latter reacting the discharge station.

Upon the flights returning to the bottom of the tank, they move through a travel segment D, during which the leg 23b of each flight projects upwardly.

As seen in FIG. 1, the right-hand edge 15a of plate 15 may be offset downwardly and spaced from the periphery of sprocket 21. The reason for this configuration is to facilitate removal of any product which might have settled upon the upper surface of plate 15 by sliding said product off the surface as the flights are moved across the upper surface of the plate 15. As the settled waste products are moved along plate 15 by the traversing flights, resistance to the load will produce desired tension in chain section 18a and b during travel through segment A. The product which is removed from plate 15 is once again engaged by the flights as they move through travel segment A. Where two or more plates 15 are utilized in place of the single plate, as shown, a suitable spacing is provided between successive plates which will permit the waste product accumulated on one or more of the upper surfaces of the plates, to be removed therefrom and fall onto the lower surface of the frame section 13.

Because of a substantial proportion of each flight being in contact with the upper surface of the plate or plates 15, a substantial amount of frictional resistance is created between the moving flight legs 23a and the stationary plate or plates. The friction is transformed into producing a drag on the chain sections 18a and b which, in turn, causes said chain sections to become taut and the flight legs 23b connected thereto to extend rigidly vertically downwardly as the flights pass through travel segment A. Unless the chain sections are taut, the effectiveness of the flights engaging the accumulated product may be seriously impaired. In instances where the accumulated product consists of metallic scraps of filings, for example, the flight legs 23b may encounter substantial resistance to movement and unless the necessary tension in the chain sections is produced, the flights will roll or tip and the flight legs 23b carried thereby might ride or pass over the accumulated product.

If desired, suitable guides or tracks, not shown, for the chain sections may be provided in the frame vertical section 14. Furthermore, while plate 15 is shown as imperforate, it may be perforate, if desired, thereby reducing the extent to which the product would accumulate on the plate. A timer, not shown, may be utilized, in combination with the motor for drive sprocket 20 and thus the cycle of operation of apparatus may automatically be controlled to meet a particular waste handling problem.

Thus, it will be seen that an improved product handling apparatus has been provided which is simple in construction and yet effective in operation even when used within a tank having a bottom surface of relatively small dimension.

While a single embodiment of the invention has heretofore been described, it is to be understood, of course, that the invention is not limited thereto, but further modifications are contemplated and it is intended by the appended claims to cover such modifications.

I claim:

1. A product handling apparatus for use in a product settling tank having a substantially flat bottom and vertical walls delimiting same, said apparatus comprising a frame having a vertical section positionable adjacent one vertical wall of the tank, and an open top base section connected to and extending laterally from the lower end of said vertical section, said base section being positionable in substantially coincident overlying contacting relation with respect to the tank bottom; a substantially flat plate mounted on said frame and in spaced registered relation with respect to said base section; and an endless conveyor assembly mounted on and carried by said frame, said assembly including an endless carrier means, wheel means mounted on said frame adjacent the upper end of said frame vertical section and adjacent the distal end of said base section, guide means mounted on said frame at the juncture of said vertical and base sections, drive means operatively connected to the wheel means adjacent the upper end of said vertical section whereby said carrier means moves in one direction about said wheel means, and a plurality of elongated transversely extending flights mounted in spaced relation on said carrier means, said flights, when in a first segment of travel, moving lengthwise of said base section and contacting the product accumulated thereon and moving same towards said frame vertical section, and, when in a second segment of travel, moving lengthwise upwardly of said frame vertical section and elevating the contacted product above said frame to a discharge station, and when in a third segment of travel, resting upon and frictionally engaging the upper surface of said plate while moving in a direction away from said frame vertical section; each flight substantially spanning the width of said base and vertical sections.

2. The apparatus of claim 1 wherein said carrier means comprises a pair of endless flexible band elements arranged in spaced side-by-side relation, and said flights are disposed transversely thereof, each flight having a first portion interconnecting corresponding segments of said band elements and a second flange portion extending transversely outwardly from said first portion for contacting the product accumulated on said base section; and said substantially flat plate being disposed intermediate said band elements and frictionally engaged by the first portion of each flight as said flight moves through said third segment of travel.

3. The apparatus of claim 2 wherein said flat plate is horizontally disposed and is positioned between said guide means and the wheel means disposed adjacent the distal end of said frame base section, said flat plate having a width substantially the same as the distance between said carrier band elements.

4. The apparatus of claim 2 wherein said band elements comprise sections of chain and each flight comprises a section of angle iron with one leg thereof projecting outwardly from said chain sections to form a product-contacting flange.

5. In a product handling apparatus provided with a flighted endless carrier which is adapted to move horizontally in one direction through a flat segment of travel whereby an accumulated product is contacted and moved by the carrier flights, and which is adapted to move vertically in one direction through a second segment of travel whereby the contacted accumulated product is elevated to a predetermined discharge station, a method of imparting tension to the carrier while moving through said first segment of travel, said method comprising moving said carrier subsequent to said second segment of travel and prior to said first segment of travel through a third segment of travel in a direction opposite to the direction it will subsequently move while in said first segment of travel, and causing the flights of said carrier to frictionally engage an elongated surface while moving through said third travel segment.

UNITED STATES PATENT OFFICE
CERTIFICATE OF CORRECTION

Patent No. 3,576,251   Dated April 27, 1971

Inventor(s) ROBERT W. CLYNE

It is certified that error appears in the above-identified patent and that said Letters Patent are hereby corrected as shown below:

Column 5, line 1 - "flat" should be --first--

Signed and sealed this 10th day of August 1971.

(SEAL)
Attest:

EDWARD M. FLETCHER, JR.
Attesting Officer

WILLIAM E. SCHUYLER, J
Commissioner of Patent